United States Patent Office

3,000,783
Patented Sept. 19, 1961

3,000,783
PROCESS OF STABILIZING SOLUTIONS OF CHLOROPROCAINE AND THE LIKE
Henry C. Marks, Glen Ridge, and Robert R. Joiner, Belleville, N.J., assignors to Wallace & Tiernan Inc., a corporation of Delaware
No Drawing. Filed Apr. 28, 1958, Ser. No. 731,144
8 Claims. (Cl. 167—52)

This invention relates to the preparation of aqueous solutions of substances such as 2-chloroprocaine hydrochloride, which has considerable use as an anesthetic to be administered by injection and which is a highly effective representative of a type of compound which may be defined as the 2-chloro-4-aminobenzoic acid ester of an N-alkyl substituted alkyl amino alcohol. The specific compound which is here conveniently designated 2-choloroprocaine and indeed is known by such name, has the more complete chemical designation of diethylaminoethyl 2-chloro-4-aminobenzoate. In the form of its acid addition salt, commonly the hydrochloride (although other salts may be made such as the sulfate, phosphate, tartrate, and the like), 2-chloroprocaine is soluble in water and as indicated above, is especially useful as an anesthetic or for similar purposes. For convenience herein, the substance will be sometimes referred to simply as 2-chloroprocaine, it being understood that unless otherwise indicated, the acid addition salt, e.g. hydrochloride, is intended.

For medical use, i.e. for injection with a hypodermic needle or the like, substances of this type are commonly distributed and sold as dilute water solutions, usually also containing sodium chloride (to constitute so-called saline solutions) of suitable concentration. For example, in a sodium chloride solution of approximately physiological strength, the anesthetic substance may have a concentration of 0.5% to 5%, particularly convenient values for such aqueous solutions of 2-chloroprocaine being 1%, 2% and 3%.

Solutions of substances of this general chemical class, including also the well known local anesthetic procaine, are subject to some degradation over a period of storage, by the effect of dissolved oxygen that unavoidably occurs in the solution. That is to say, it is essentially impossible, in any practical manufacturing operation, to prevent the existence of dissolved oxygen in the water, so that chemical deterioration occurs, even though the solutions are packaged in sealed ampoules. This deterioration is found to occur with 2-chloroprocaine, as well as with earlier known materials of this general type, such as procaine (diethylaminoethyl-4-aminobenzoate). In order to prevent the effect, it has been the practice to make up solutions of this type of local anesthetic, such as procaine, with a content of sodium bisulfite, usually somewhat less than 1%. This compound is effective in protecting the anesthetic substance against the action of oxygen, and it is particularly usable in the anesthetic solutions for injection, because of its other properties. This sodium bisulfite is non-toxic and non-irritating in the quantities used, and is compatible with these materials, i.e. in degree of acidity. Specifically, sodium bisulfite has a degree of acidity which very closely matches the normal acidity of 2-chloroprocaine hydrochloride solution.

Whereas sodium bisulfite has been used widely in procaine solutions and has served its purpose well without objectionable effects, and whereas it would therefore be logical to use the same compound as an antioxidant with 2-chloroprocaine or the like, it has been found that a serious difficulty arises in preparing solutions of the latter type with sodium bisulfite. Thus in making such solution in the usual way, using the available bisulfite whether of commercial or laboratory reagent grade, it appears impossible to achieve a solution that will remain satisfactory. That is to say, instead of remaining clear, the solution deposits crystals and thus becomes worthless for the intended use of administration by injection.

It has now been discovered that this difficulty arises from the fact that all known sodium bisulfite, no matter how pure it may originally be, is partly converted on standing, and particularly in the late stages of its manufacture, to sodium dithionate. In other words, it appears that sodium bisulfite ordinarily contains a certain percentage of sodium dithionate. As a result, it appears that in the solutions of 2-chloroprocaine, there is formed a certain amount of 2-chloroprocaine dithionate, which is a comparatively insoluble substance. In this way, even small percentages of dithionate are sufficient to cause deposition of crystals in these solutions. It will be understood that the basic formula for sodium bisulfite is $NaHSO_3$ and that the corresponding formula for sodium dithionate (sometimes called sodium hyposulfate) is $Na_2S_2O_6$.

The present invention, directed to the avoidance of the difficulties described above, is predicated on the discovery that if the sodium bisulfite is formed either shortly before using or in the liquid in which 2-chloroprocaine has already been dissolved, the objectionable appearance or effects of dithionate can be avoided. Thus the present process for making stable, clear solutions of 2-chloroprocaine involves the preparation of sodium bisulfite, by appropriate reaction, in at least a part of the water used for the final solution, the 2-chloroprocaine material being incorporated at a time not later than reasonably soon after the reaction which produces the bisulfite, i.e. sufficiently soon as to avoid appreciable formation of dithionate. That is to say, the chloroprocaine can first be dissolved in the entire body of water and then the agents are added which react to yield the bisulfite, or alternatively the bisulfite can be prepared in an appropriate body of water and the chloroprocaine thereafter added, conveniently in solution form.

When this procedure is followed, so as to produce the desired solution of 2-chloroprocaine containing sodium bisulfite as antioxidant, the difficulty of crystal deposit has been found to be obviated. The solution is fully effective for its intended use, e.g. as an anesthetic to be administered by injection, and is not only stabilized by the bisulfite against degradation of the 2-chloroprocaine by the action of dissolved oxygen, but is also stabilized against deposit of crystals or other insoluble matter which would interfere with its use.

As indicated, the process may be carried out in various ways, using appropriate reagents to produce the sodium bisulfite. Although it is conceivable that equivalents may be employed, the various specific operations described hereinbelow involve the use, in each case, of at least one of two particularly convenient and readily available starting materials, viz. sodium sulfite and sulfur dioxide. Neither of these compounds, as conventionally produced, does or can contain dithionate in sufficient amount to cause precipitation of 2-chloroprocaine. It will be understood that sulfur dioxide, when employed, is passed into the water or other aqueous liquid and that references herein to the use of sulfur dioxide should also be taken to include sulfurous acid solutions, freshly prepared.

An unusually simple and advantageous procedure, which is therefore at present greatly preferred, is to establish the desired aqueous solution of 2-chloroprocaine and to convert sodium sulfite to sodium bisulfiite in such solution, thereby directly and immediately producing the desired, stabilized, clear product. Thus specifically, an aqueous solution of 2-chloroprocaine of the desired concentration is first made up, including salt (sodium chloride) and any other ingredients that may be needed, and there is also added a measured amount of dilute hydrochloric acid. Then the requisite amount of sodium sulfite (e.g. in solid, divided form, as fine crystals) is added. It reacts with the hydrochloric acid to produce soduim bisulfite,. Since the conditions are such that the exact amount of hydrochloric acid is difficult if not impossible to calculate, some final pH adjustment may be required. This pH adjustment can be effected either with dilute hydrochloric acid or dilute sodium hydroxide, depending on the direction in which such adjustment is to be made to reach a pH (as calculated or determined by test) representative of the desired bisulfite concentration. The final product is then a stable, clear solution of 2-chloroprocaine hydrochloride with a suitable content of sodium bisulfite.

An alternate example of the invention involves the preparation of two separate solutions, each comprising a part of the total amount of water needed for the desired batch of 2-chloroprocaine solution. Thus in one part of the water, the 2-chloroprocaine, and other ingredients as desired, may be dissolved, while in the remaining part of water, sodium sulfite, in predetermined amount, is placed in solution. To the last-mentioned solution hydrochloric acid is then added, conveniently in a gradual manner and with careful and repeated measurement of pH, until a point has been reached where all of the sodium sulfite has been converted to bisulfite. This freshly prepared bisulfite solution (or an appropriate quantity of it) is then combined with the 2-chloroprocaine solution, resulting in the desired stabilized, clear product.

Other instances of the new process involve the use of sulfur dioxide. Thus sulfur dioxide gas is passed into an aqueous solution of sodium hydroxide or sodium carbonate until a point is reached (readily determinable, as will now be appreciated, by pH measurement) where the desired sodium bisulfite has been formed. This sodium bisulfite solution, in appropriate amount, can then be combined with a previously prepared aqueous solution of 2-chloroprocaine, just as in the final step of the last example set forth above.

A still further mode of procedure involves the preparation of the separate sodium bisulfite solution by passing sulfur dioxide gas into an aqueous solution of sodium sulfite. As before, the pH is carefully observed, so that the reaction is brought to the desired point of sodium bisulfite production by the reaction of the sulfur dioxide ($SO_2$) with sodium sulfite ($Na_2SO_3$). This sodium bisulfite solution is then combined with a solution of 2-chloroprocaine, to yield the final, stabilized solution.

It will be seen that all of these procedures may be described as involving the step of producing sodium bisulfite by reaction in water between a substance of the class consisting of sodium sulfite and sulfur dioxide, and an appropriate cooperating reagent, e.g. an acid such as hydrochloric acid or sulfurous acid (applied in the form of sulfur dioxide) to convert the sulfite to the form of bisulfite, or alternatively an alkali such as sodium hydroxide or sodium carbonate to react with sulfur dioxide. The procedure further includes the incorporation of the 2-chloroprocaine in the same body of water, for example either by first dissolving such compound in the water prior to the addition and reaction of the bisulfite-producing reagents, or by preparing a separate aqueous solution of 2-chloroprocaine and combining it with the bisulfite solution.

That is to say, in either of these last-mentioned operations, the 2-chloroprocaine is in effect incorporated in solution, in the same body of water with the bisulfite, at a time not later than sufficiently soon after the described reaction has occurred, as to avoid production of dithionate. It will be appreciated that where the bisulfite solution is made separately, the incorporation of the 2-chloroprocaine (as by combining with a solution of the latter) should not be delayed a long time, yet need not be immediate. For instance, the bisulfite solution, especially if made and kept under a blanket of nitrogen, can safely stand for periods of the order of 24 hours or so before combining it with the 2-chloroprocaine solution and packaging the final product. In all cases of the process as described above, the result is an introduction of bisulfite into solution with 2-chloroprocaine, without forming any appreciable amount of sodium dithionate.

A specific instance of the first and preferred method, which is simplest and requires least manipulation in order to insure the desired result, is as follows:

For illustration, the preparation of 100 liters of a 2% solution of 2-chloroprocaine hydrochloride, containing other conventional ingredients such as sodium chloride and methyl paraben, is described. The ingredients or reagents to be used are:

| | |
|---|---|
| 2-chloroprocaine hydrochloride | 2040 gms. |
| Sodium chloride, U.S.P | 400 gms. |
| Methyl paraben, U.S.P | 100 gms. |
| Sodium sulfite, U.S.P | 266 gms. |
| Hydrochloric acid, U.S.P | sufficient to adjust pH to 4.0. |
| Water (pyrogen-free) q.s. to 100 liters. | |

94 liters of the pyrogen-free water (suitable for injection) are measured into a glass or glass-lined vessel. Nitrogen is bubbled vigorously through the water for a minimum of 15 minutes before any ingredients are added, and the bubbling of nitrogen is continued throughout the remainder of the operations of preparing the solution. The sodium chloride and methyl paraben are then dissolved in the measured quantity of water. 2.15 liters of 1 N hydrochloric acid are added and the solution is thoroughly mixed. The stated quantity of 2-chloroprocaine hydrochloride is thereupon introduced, the solution being protected from light at this point and during all further operation. The chloroprocaine is dissolved as rapidly as possible and as soon as solution is complete, the stated amount of sodium sulfite is added. Again, this substance is brought into solution as soon as possible and thereafter the pH of the solution is immediately adjusted to the value of 4.0 plus or minus 0.1, using 1 N hydrochloric acid if the pH is higher than 4.0 or using 1 N sodium hydroxide solution if the pH is below 4.0. These pH determinations are electrometrically made, as will be readily understood. The solution is then brought to the final quantity of 100 liters by the addition of further pyrogen-free water. The resulting, final solution is then kept well sealed and maintained under nitrogen blanket until it has been appropriately sterilized, e.g. by a conventional filtration operation (as through a Selas filter candle), whereupon it may be dispensed into the desired ampoules or other containers, for distribution and use.

The final product is 100 liters of aqueous solution having the following composition:

| | Percent |
|---|---|
| 2-chloroprocaine hydrochloride | 2.0 |
| Sodium chloride | 0.4 |
| Methyl paraben | 0.1 |
| Sodium bisulfite | 0.2 |

It may be noted that the amount of sodium sulfite used (266 grams) is 10% more than theoretically needed to provide the final content of 0.2% sodium bisulfite, but the excess is employed because there is inevitably some loss due to oxygen dissolved in the water.

The described final product is a clear solution which is found to maintain its clarity and the desired chemical content of 2-chloroprocaine hydrochloride, in stabilized form, over relatively long periods of time.

While the above illustration relates to the preparation of a 2% solution of chloroprocaine, corresponding operations can be followed for other concentrations, e.g. within the practical limit of solubility of this substance, which is about 5%. It will be understood that this and all other percentages given herein are expressed by weight. It will also be appreciated that other concentrations of sodium bisulfite may be employed and may indeed be found desirable, say within a range of 0.05% to about 1%, but the concentration in the above example is particularly suitable because it affords adequate protection against oxidation with close to a minimum of this ingredient in the solution.

While in a specific aspect the invention is directed to the preparation of stable, clear solutions of 2-chloroprocaine, it is understood that the process (as performed in any of the above ways) is applicable to the production of solutions of the other substances, which are known (see U.S. Patent No. 2,460,139, issued January 25, 1949), of the special class of 2-chloro-4-aminobenzoic acid esters of N-alkyl substituted alkyl amino alcohols, with like results.

It is to be understood that the invention is not limited to the particular operations herein described, but may be carried out in other ways without departure from its spirit.

What is claimed is:

1. A method of preparing a stable, clear aqueous solution which is to comprise water, 2-chloroprocaine hydrochloride, and sodium bisulfite as an antioxidant, comprising reacting sodium sulfite with hydrochloric acid for producing sodium bisulfite therefrom, in a body of water, said reactants, which are said sodium sulfite and said hydrochloric acid, being employed in amounts for substantially complete reaction thereof to produce sodium bisulfite in solution, said method including incorporating the 2-chloroprocaine hydrochloride in the last-mentioned water at a time which is selected within a period that begins before introduction of either aforesaid reactant in the water and that terminates substantially promptly after introduction of both reactants, so that there is no appreciable formation of dithionate from the bisulfite before the desired aqueous solution of 2-chloroprocaine hydrochloride and sodium bisulfite is completed.

2. A method of preparing a stable, clear aqueous solution which is to comprise water, 2-chloroprocaine hydrochloride and sodium bisulfite as an antioxidant, comprising establishing an aqueous solution of the 2-chloroprocaine hydrochloride and thereafter reacting in said solution hydrochloric acid and sodium sulfite to produce sodium bisulfite therein, said reactants, which are said sodium sulfite and said hydrochloric acid, being employed in amounts for substantially complete reaction thereof to produce sodium bisulfite in solution, and at least one of said reactants being introduced into said aqueous solution after the 2-chloroprocaine hydrochloride has been dissolved therein.

3. A method as defined in claim 2, wherein the 2-chloroprocaine hydrochloride is introduced in an amount to provide a quantity thereof selected in the range of 0.5% to 5% in the completed aqueous solution, and wherein the amounts of said reactants are chosen to provide a quantity of sodium bisulfite selected in the range of 0.05% to 1% in the completed aqueous solution.

4. A method of preparing a stable, clear aqueous solution which is to comprise water, 2-chloroprocaine hydrochloride and sodium bisulfite as an antioxidant, comprising reacting sodium sulfite and hydrochloric acid in a body of water to produce sodium bisulfite in solution, and immediately thereafter combining said solution with an aqueous solution of 2-chloroprocaine hydrochloride, said reactants, which are said sodium sulfite and said hydrochloric acid, being employed in amounts for substantially complete reaction thereof to produce sodium bisulfite in solution.

5. A method of preparing a stable, clear aqueous solution which is to comprise water, from 0.5% to 5% of 2-chloroprocaine hydrochloric and from 0.05% to 1% of sodium bisulfite as an antioxidant, which includes the steps of establishing a solution comprising substantially all of the required water, the required amount of 2-chloroprocaine hydrochloride, and one of two reactants which consist respectively of sodium sulfite and hydrochloric acid, and then adding the other of said reactants to said solution for reaction therein with the first-included one of said reactants to yield sodium bisulfite, said reactants being employed in amounts for substantially complete reaction thereof to produce said sodium bisulfite in solution and in the required quantity.

6. A method as defined in claim 5, wherein the hydrochloric acid is incorporated in amount approximately adapted to yield the required amount of sodium bisulfite, and wherein the precise required amount of sodium bisulfite is achieved by adjusting the pH of the solution to a correspondingly required value, said pH adjustment from a higher value being effected with hydrochloric acid and from a lower value being effected with an alkaline soda compound.

7. A method of preparing a stable, clear aqueous solution which is to comprise water, a compound consisting of an addition salt of the 2-chloro-4-aminobenzoic acid ester of an N-alkyl substituted alkyl amino alcohol, and sodium bisulfite as an antioxidant, comprising reacting sodium sulfite with hydrochloric acid for producing sodium bisulfite therefrom, in a body of water, said reactants, which are said sodium sulfite and said hydrochloric acid, being employed in amounts for substantially complete reaction thereof to produce sodium bisulfite in solution, said method including incorporating the aforesaid compound in said body of water at a time which is selected within a period that begins before introduction of either aforesaid reactant in the water and that terminates substantially promptly after introduction of both reactants, so that there is no appreciable formation of dithionate from the bisulfite before the desired aqueous solution of the aforesaid compound and sodium bisulfite is completed.

8. A method as defined in claim 7, wherein the aforesaid compound is incorporated in the body of water by dissolving it therein prior to said reacting step and before no more than one of said reactants has been introduced.

References Cited in the file of this patent

UNITED STATES PATENTS

| | | |
|---|---|---|
| 2,005,667 | Steinbrenck | June 18, 1935 |
| 2,382,546 | Curtis | Aug. 14, 1945 |
| 2,391,552 | Curtis | Dec. 25, 1942 |

OTHER REFERENCES

Foldes et al.: Anesthesiology, vol. 13 (May 1952), pp. 287–296 (p. 287 pertinent).

U.S. Dispensatory, 25th Ed., (1955) J. B. Lippincott Co., Philadelphia, pp. 1257–1258, POSL RS 151.2 D5 1955.